US009218591B2

(12) United States Patent
White

(10) Patent No.: US 9,218,591 B2
(45) Date of Patent: *Dec. 22, 2015

(54) METHOD AND SYSTEM FOR ESTABLISHING AND USING A SOCIAL NETWORK TO FACILITATE PEOPLE IN LIFE ISSUES

(71) Applicant: Emily J. White, Mountain View, CA (US)

(72) Inventor: Emily J. White, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,967

(22) Filed: Jul. 22, 2014

(65) Prior Publication Data

US 2015/0019450 A1    Jan. 15, 2015

Related U.S. Application Data

(63) Continuation of application No. 13/173,398, filed on Jun. 30, 2011, now Pat. No. 8,812,562, which is a continuation of application No. 12/489,289, filed on Jun. 22, 2009, now Pat. No. 7,984,070, which is a continuation of application No. 11/386,444, filed on Mar. 21, 2006, now Pat. No. 7,567,977, which is a continuation-in-part of application No. 10/934,265, filed on Sep. 2, 2004, now Pat. No. 7,565,344.

(60) Provisional application No. 60/499,543, filed on Sep. 3, 2003.

(51) Int. Cl.
*G06F 7/00* (2006.01)
*G06F 17/30* (2006.01)
*G06Q 10/10* (2012.01)
*G06Q 30/02* (2012.01)
*G06Q 50/00* (2012.01)

(52) U.S. Cl.
CPC ............... *G06Q 10/10* (2013.01); *G06Q 30/02* (2013.01); *G06Q 50/01* (2013.01); *Y10S 707/99933* (2013.01); *Y10S 707/99943* (2013.01); *Y10S 707/99945* (2013.01); *Y10S 707/99952* (2013.01)

(58) Field of Classification Search
CPC ............ G06Q 50/01; Y10S 707/99939; Y10S 707/99944; H04L 12/58; H04L 67/22; H04L 67/306
USPC ......................................................... 707/791
See application file for complete search history.

(56) References Cited

U.S. PATENT DOCUMENTS

| 6,052,122 | A | * | 4/2000 | Sutcliffe et al. ............... 715/751 |
| 6,061,681 | A | * | 5/2000 | Collins ................................. 1/1 |
| 6,073,105 | A | * | 6/2000 | Sutcliffe et al. .............. 705/14.4 |
| 6,324,541 | B1 | * | 11/2001 | de l'Etraz et al. ..................... 1/1 |
| 7,069,308 | B2 | * | 6/2006 | Abrams ........................ 709/218 |
| 2002/0059201 | A1 | * | 5/2002 | Work ................................ 707/3 |
| 2002/0116466 | A1 | * | 8/2002 | Trevithick et al. ............ 709/206 |
| 2002/0171687 | A1 | * | 11/2002 | Li et al. ......................... 345/853 |

(Continued)

*Primary Examiner* — Binh V Ho
(74) *Attorney, Agent, or Firm* — Mahamedi Paradice LLP

(57) ABSTRACT

Embodiments described herein provide numerous applications and implementations of a social network to facilitate individuals to resolve various life issues. These issues may include issues that arise when individuals or families relocate, including logistic problems, assimilation of family members in a community, and roommate pairings. As will be described, embodiments described herein greatly facilitate corporations in relocating their employees logistically, and also assist employees and their families with life issues that may determine whether the employees' relocation will be a success.

8 Claims, 10 Drawing Sheets

(56) References Cited

U.S. PATENT DOCUMENTS

| | | | |
|---|---|---|---|
| 2004/0117528 A1* | 6/2004 | Beacher et al. | 710/111 |
| 2004/0122810 A1* | 6/2004 | Mayer | 707/3 |
| 2005/0021750 A1* | 1/2005 | Abrams | 709/225 |
| 2005/0235062 A1* | 10/2005 | Lunt et al. | 709/225 |
| 2007/0005750 A1* | 1/2007 | Lunt et al. | 709/223 |

* cited by examiner

630 — SAN MATEO COUNTY AND PALO ALTO WELCOME AL BENTEL
Relocating to  3000 Hanover Street
               Palo Alto        CA    94307

632 — Issue Category  Schools

634 — Use New Office Location
       City       State    ZIP
       Radius ☐ 0-25 mi ☐ 0-50 mi ☐ 0-75 mi ☐ 0-100 mi 636 — Use New Home Location
638 — City       State    ZIP
       Radius ☐ 0-25 mi ☐ 0-50 mi ☐ 0-75 mi ☐ 0-100 mi Subject         School for deaf child
640 — Issue Message    Hello: I need a referral to a school which can assist my 10 year old deaf child.

| Inbox | Send Message | Find Other Friends | Create Profiles | Service Providers | Virtual Account |

Send a Message By Issue

[ Send Message ]

The issue I need help with isn't listed - I want to talk to someone specific from the list below 650 — Select a Specific Person
Human Resources Admin.
My Recruiter
My Relocation Counselor
Immigration Lawyer
Travel Administration

652

( Send )  ( Clear )

METHOD AND SYSTEM FOR ESTABLISHING AND USING A SOCIAL NETWORK TO FACILITATE PEOPLE IN LIFE ISSUES

RELATED APPLICATIONS

This application is a continuation of U.S. patent application Ser. No. 13/173,398, filed Jun. 30, 2011 titled "Method and System for Establishing and Using A Social Network To Facilitate People in Life Issues", which is a continuation of U.S. patent application Ser. No. 12/489,289, filed Jun. 22, 2009 titled "Method and System for Establishing and Using A Social Network To Facilitate People in Life Issues", issued as U.S. Pat. No. 7,984,070, which is a continuation of U.S. patent application Ser. No. 11/386,444, filed Mar. 21, 2006 titled "Method and System for Establishing and Using a Social Network to Facilitate People in Life Issues", issued as U.S. Pat. No. 7,567,977, which is a continuation in part application of U.S. patent application Ser. No. 10/934,265, filed Sep. 2, 2004 titled "Method and System for Establishing and Using a Social Network to Facilitate People in Life Issues", issued as U.S. Pat. No. 7,565,344, which claims benefit of priority to Provisional U.S. Patent Application No. 60/499,543, filed Sep. 3, 2003, titled "System and Method of Managing Essential Collaborative Activities of the Corporate Relocation Process Pre, During, and Post Move," and naming Emily J. White as inventor; all of the aforementioned priority applications are hereby incorporated by reference in their entirety for all purposes.

TECHNICAL FIELD

The disclosed embodiments relate generally to the field of social networking. In particular, the disclosed embodiments relate to a system and method for establishing and using a social network to facilitate people in life issues.

BRIEF DESCRIPTION OF THE DRAWINGS

FIGS. 6A-6E illustrates different user-interfaces for use with embodiments of the invention.

DETAILED DESCRIPTION

Overview

Figure 1:
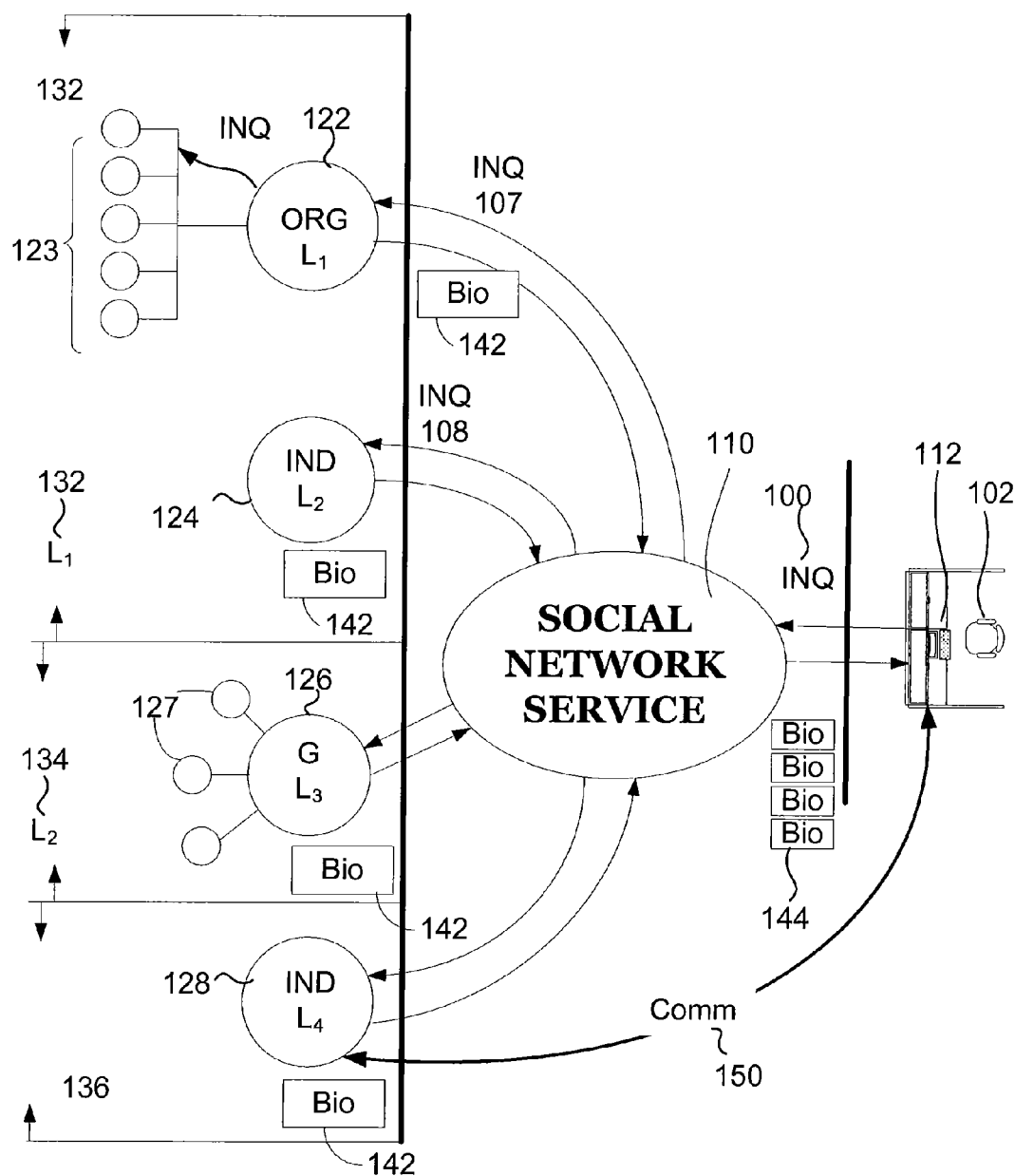
FIG. 1 is a block diagram depiction of a system that incorporates a social network service, under an embodiment of the invention.

Embodiments described herein provide numerous applications and implementations of a social network to facilitate individuals to resolve various life issues. These issues may include problems and concerns that arise when individuals or families travel or relocate. These issues include logistic problems, problems arising with assimilating family members in a community, and, in certain context, roommate pairings. As will be described, embodiments described herein greatly facilitate corporations in relocating their employees logistically, and also assist employees and their families with life issues that may determine whether the employees' relocation will be a success.

In an embodiment, a social network may be established and used to assist individuals in having issues resolved at a particular geographic location, particularly one that is unfamiliar to them (such as in the case where they are moving to a new city). According to one embodiment, a list is maintained of participants who can assist in resolving issues at the particular geographic location. The participants may correspond to individuals, organizations, or groups. The user may be presented with a plurality of categories from which the user may make a selection. The user may make a category selection and enter an inquiry (such as one pertaining to a problem the individual is having). A message is generated and sent to a service that corresponds to the user's category and issue. The message may omit a specific recipient for the inquiry. After receiving the selection of the category and receiving the inquiry, the service selects a recipient/participant for the user. The inquiry of the user is then sent to that participant. Subsequently, the user and the recipient/participant are enabled to communicate with one another.

Other variations to an embodiment such as described are possible. In one embodiment, in response to receiving the user's category selection and inquiry, the user is provided a plurality of biographies of possible issue resolvers who may be able to assist the user in his issue. The selection of possible issue resolvers may be based on one or more of the category selection or attribute or characteristic of the inquiry (e.g. key word), or other information provided by the user (e.g. geographic information). For example, a user may make a selection of a geography and of a category of issues, using menus.

Still further, another embodiment maintains a list of individuals/recipients who are assigned to resolve issues falling under a particular category. The designation of an individual or recipient to a category may be set, so that a user's subsequent category selection determines who the recipient of the user's inquiry will be. The inquiry may then be sent to the recipient designated for the inquiry's category selection. The performance of the recipient to resolving the issue presented in the inquiry is then monitored or tracked.

One or more embodiments described herein may be implemented through the use of modules. A module refers to a program, a subroutine, a portion of a program, a software component, firmware or a hardware component capable of performing a stated task or function. A module can exist on a hardware component such as a server independently of other modules, or a module can exist with other modules on the same server or client terminal, or within the same program. A module may be implemented on a client or on a server, or distributed between clients, servers, or amongst a client-server.

Furthermore, one or more embodiments described herein may be implemented through the use of instructions that are executable by one or more processors. These instructions may be carried on a computer-readable medium. Services and components illustrated by figures in this application provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

System Overview and Methodology

FIG. 1 is a block diagram depiction of a system that incorporates a social network service 110, under an embodiment of the invention. The social network service 110 may be provided by one or more modules or applications that execute on servers or other networked computers that are available to terminals. At one stage, the service 110 receives inquiries from users who inquire about a particular matter or issue. At another stage, the service 110 has available to it participants at various geographic locations. The participants may include individuals, groups that require participation from individuals (e.g. clubs, companies) and other organizations or charters (e.g. Chambers of Commerce) that people may belong to, are employed by, volunteer for, or are somehow associated with on a professional, quasi-professional, or personal level. Users may submit inquiries to the service 110, including issues that need to be resolved or inquiries for information on a particular topic. The service 110 may select which participants are best suited to respond to that inquiry.

In an embodiment, a user 102 may operate a terminal 112 to submit an inquiry 108 to the service 110. The inquiry 108 may be blind, in that it is not addressed to or for an identified individual or participant. For example, the inquiry 108 may be a web-based message (e.g. email or web form) to an unidentified person. In one embodiment, the inquiry 108 (i) may be a question, (ii) request for assistance about a particular topic, or (iii) request for whom the user 102 can contact regarding a topic or issue. Communications between the user 102/terminal 112 and the service 110, between the participants and the service 110, and/or between the user and the participants, may be conducted over a data network, which may include Internet (or a Local Area Network), public switched telephone system, and/or cellular data networks.

The service 110 may be equipped with data and intelligence in order to be able to select participants who are most pertinent or best capable of handling the inquiry 108. The service 110 may make a selection of participants on behalf of user 102. In an embodiment such as shown by FIG. 1, four sets of participants are shown. An organization 122 is shown having, as associates or subscribers, numerous individuals 123. An example of an organization is a chamber of commerce, with individuals who work for or owning businesses being participants of the organization. Another example of an organization is an entity that has associated individuals as employees. Other participants shown in the example of FIG. 1 include a first individual 124, a group 126 (such as a club) having individual members 127, and a second individual 128. The participants may reside at different locations. In the example shown, organization 122 and first individual 124 reside at location 132 (L1), while group 126 resides at location 134 (L2) and second individual 128 resides at location 126 (L3). Each of the locations 132, 134, 136 may correspond to, for example, cities, states, or countries, although smaller geographic areas are also contemplated (e.g. city blocks, campus buildings).

In an embodiment, part of the consideration that the service 110 makes in selecting what participants should receive the user inquiry 108 is based on geography. The user 102 may specify location with the inquiry, or the service 110 may make a determination as to what location to select based on other information. However, an embodiment provides that the user 102 does not identify who is to receive the communication. Often, the case is that the user does not know who can respond to this inquiry. The service 110 may maintain information about numerous participants, including the participants 122-128 shown, as well as the respective location of each participant. The service 110 may use the information provided by the user 102 to narrow or otherwise select participants to handle the inquiry 108. Other information that may be maintained by the service 110 includes personal information, such as biographical information of individuals. The biographical information may comprise numerous items, including for example: name, age, education, place of higher-education, career, hobbies, place of origin, music preferences, expertise and knowledge, photograph, and audio message. The biographical information may also contain information that indicates what that individual's expertise is. This information may be collected for individuals in the organization 122 or group 126, as well as for the case where the participants are first individual 124 and second individual 128.

In one implementation, the service 110 selects the participants who will receive the inquiry based on an indication from the user of a topic or category of the communication. As shown by another embodiment, service 110 may display a user-interface that includes multiple category listings, and the user 102 may select from the category listings a category. However, the user may use other mediums to communicate to the service 110 a category or topic selection pertaining to an issue or problem of concern, including specifying the category in the inquiry 108. As an alternative or additional selection criteria, the service 110 may select the participants who will receive the inquiry 108 based on information that is maintained about the participants. In one embodiment, the information maintained includes the locations 132-136 of the respective participants. Biographic information may also be maintained. The inquiry 108 from the user may, either by itself or through other communications, give the basis for the service 110 to make the selection of participants, and this basis may correspond to a geography that pertains to the inquiry 108, or a category or topic of the inquiry. In the example shown by FIG. 1, all the participants shown are the selected participants, and unselected participants to handle the user's inquiry 108 are not shown. Other embodiments may only use participants of a particular class, such as organization/employer class, group class or individual class.

The manner in which each participant handles an inquiry may vary from participant to participant. For organization 122, the inquiry 108 may be received and distributed to its members. The members may correspond to volunteers, subscribers, or employees. The organization 122 may also be selective as to which participants receive the inquiry 108. The same may hold true for group 126.

Participants, or individuals of the participants, may furnish a response to the inquiry 108 by providing personal information about themselves. For example, for the case of organization 122 corresponding to a chamber of commerce, an entrepreneurial individual/member may submit a personal biography 142. Group 126 may correspond to a hobby group or church gathering, and individuals in that group may be selected by the group to furnish biographic information about themselves or the church group. The user may need to set a limit on the number of responses that he or she will be able to accept.

In an embodiment, the different biographic information is submitted by the participants selected by the service 108. Not all of the selected participants may respond. And in the case of organization 122 or group 126, multiple responses may be provided, as multiple individuals may be associated with the organization/group. The different responses may be sent back to service 108, which may compile the responses. In an embodiment where respondents provide biographies, the service 108 may form a compilation 144 of the biographies and send the compilation to the terminal 112 of the user 102. Each response may also include a preliminary answer to the user's inquiry.

The user 102 may then choose who he or she wishes to use as the inquiry handler based on the biographic information. For example, the user may decide which individuals biographic information is best suited for an issue that the user has, or which individuals location is most convenient. As another example, there may be the case where a person has to move to Chicago, and the person is in need of a medical specialist. The need to find the medical specialist may be paramount to whether the move is successful. The user's inquiry 108 may be a request for a referral to such a specialist in Chicago. The inquiry may be sent out to numerous locations, including the Chamber of Commerce in Chicago, as well as a medical organization in California that has as its members doctors. The responses may include a non-specialist doctor who is part of the Chamber of Commerce, or a specialist who is not in Chicago, but in California. Since finding a specialist is of paramount importance to the user, he may choose to communicate with the specialist in California, in hopes that he knows other specialists in Chicago. He may concurrently, or at a later time communicate with the doctor as well, but he has the choice.

One embodiment provides that the user goes through service 110 to communicate with the respondents that he chooses. Another embodiment provides that he goes outside of the service 110. While an embodiment shown by FIG. 1 shows that the service 110 forwards the responses to the inquiry 108 to the user, it may also be possible for the responses to go outside of the service 110.

While an embodiment shown in FIG. 1 describes a process where service 110 makes a selection of who is to receive the user's inquiry, other embodiments may provide that no selection is made on-the-fly. Rather, a designation may be pre-existing as to which participants are to be forwarded inquiries based on category selection and/or other selection criteria provided by the user. An example of how such a variation may be implemented is described with a method of FIG. 5. Still further, another embodiment may provide that the user makes the ultimate selection of who the participants will be. In such an embodiment, the service 110 matches possible participants to the user's category and selection criteria, and presents choices for the user. No communication is sent to the participants until after the user has selected from the choices. The choices may be provided in the form of a listing of biographical information. An example of such an embodiment is described with FIG. 4.

As an added feature, service 110 may maintain (i) a history of previous activities with regard to a particular issue and/or (ii) biographies of respondents (or even users). Users can research their issues and see how their issues have been handled in the past. If biographies of respondents are provided, users may be able to learn more about potential respondents before posing his issue to the service 110.

Figure 2:
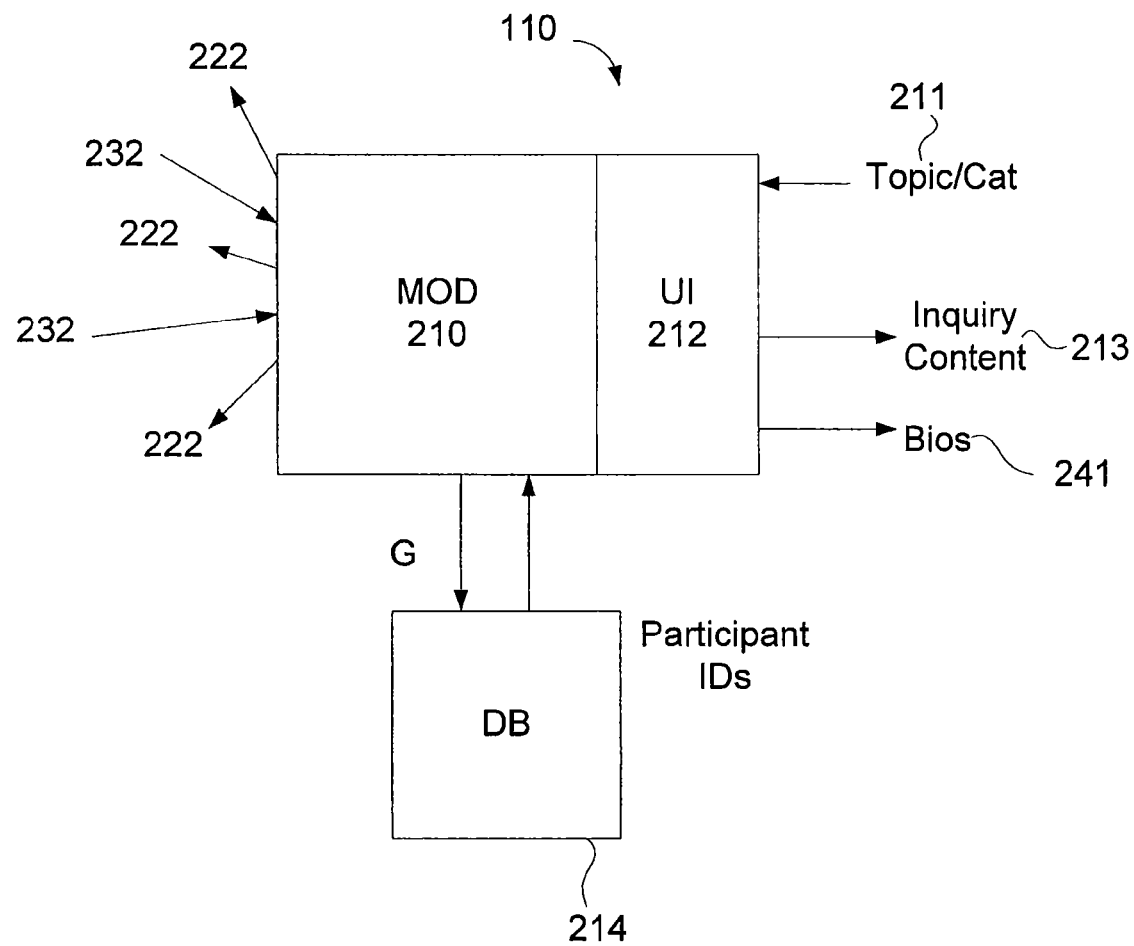
FIG. 2 illustrates components of a social network service, under an embodiment.

FIG. 2 illustrates components of social network service 110, according an embodiment. The components include a module 210, a user-interface (UI) 212 and a database 214 (although other forms of data storage may be used). The database 214 may be used to store information about the participants. This information may include one or more of the following: the location of the respective participants, the identity of the participant, the type of entity the participant is, and what topics to consider that participant for purpose of responding to inquiries. In an embodiment such as described with FIG. 4, the database 214 may include biographies completed by the individuals who are the respondents.

In one embodiment, the UI 212 enables the user to enter the inputs for creating inquiry 108, and these inputs are subsequently processed by the module 210. In one embodiment, the inputs include (1) category/topic specification 211 (2) inquiry content 213. The UI 212 may provide a form, or a template (such as for use with a messaging application) to enable a person to enter the inputs. The category specification may correspond to a list of categories, each of which are selectable. When the category is selected by the user, the module 210 receives the category as input.

In response to receiving the input through the UI 212, the module 210 selects participants using the information of the database 214. Then the module 210 sends messages 222 to selected participants, where the messages may include the inquiry content 213, or content based on the inquiry content 213. The number of messages sent 222 may be one or more.

In an embodiment, the module 210 may receive the bios 232 from recipients of messages 222. The module 210 then sends a compilation 242 (or aggregation) of the bios to the user. Additionally, the module or some other internal/external component may perform a step of tracking individual participants and/or the user, in order to see how well the user's problem was resolved.

Figure 3:
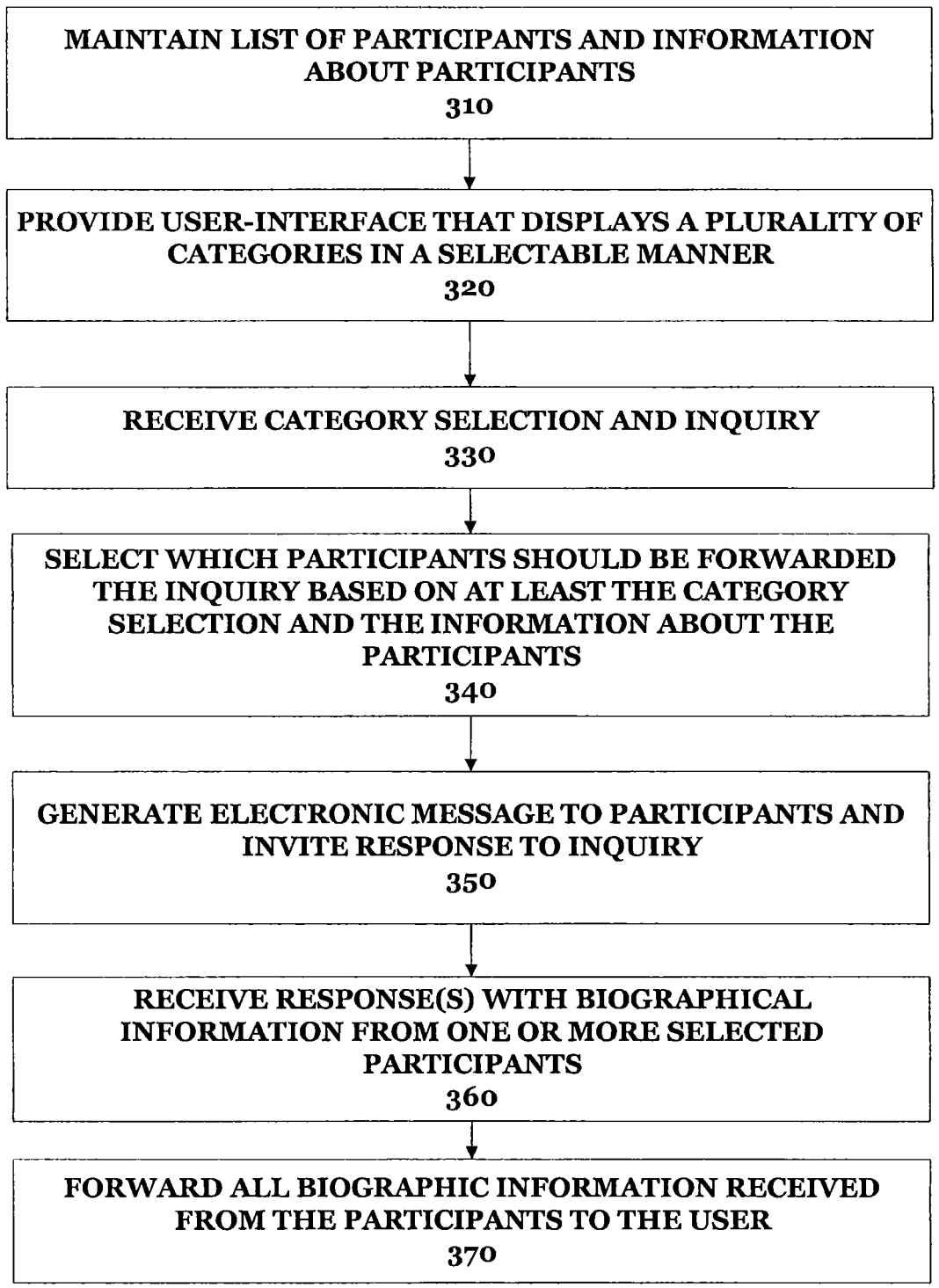
FIG. 3 illustrates a method that illustrates an implementation of a social network service, such as described in FIGS. 1 and 2.

FIG. 3 illustrates a method that illustrates an implementation of a social network service, such as described in FIGS. 1 and 2. Reference to numerals of FIG. 1 or FIG. 2 is intended to illustrate suitable components for performing a step of the method.

In step 310, a list is maintained that contains participants and information about participants. As described in FIG. 1, the participants are those entities that respond to inquiries from users, including individuals who belong to or are otherwise a part of those participants.

In step 320, a user-interface is provided that displays a plurality of categories in a selectable manner. An example of a user-interface is provided with FIGS. 6A-6D. The selectable categories may, for example, be provided in the form of a combination of icons and pull-down menus. In addition to categories, there may also be choices for sub-categories. For example, the user may select "home", then be presented a list of options such as "packing and moving", "schools" and "elder care". From those choices, the user may select "packing and moving". Through the user-interface, the user can select a category and enter the inquiry. This may involve the user using a mouse or pointer to select menu items and categories until an appropriate category is selected. In one embodiment, this causes a message to be generated on the user's terminal. The user can enter his inquiry through text (or perhaps voice input), then send the message.

In step 330, the service receives the message, which contains the category specification and the content of the inquiry.

In step 340, the service selects which participants should be forwarded the inquiry. This determination may be made based on the category selected by the user, as well as the information that is maintained about the participants. For example, the information about the participants may include an association between individuals/participant and the category. Other information may also be used. For example, in the inquiry, the user may also specify a geographic location, and the selection of the participants may be based additionally on the geographic locations. Other information that may be used to select participants include: feedback or a quality rating of the participant (so that some participants who would have otherwise matched are not selected in favor of those participants who do match and have higher ratings), and key word match between text in the inquiry and information provided by participants (e.g. biographies).

In step 350, an electronic message is generated to the participants. The electronic message invites a response to the inquiry of the user.

In step 360, one or more responses are received, from some or all of the participants. As mentioned earlier, if the participant is an organization or group, more than one response may be received. The response may be in the form of or include biographical information of an individual. For example, a typical response may include a biography and an answer or inquiry response from a participant. The biographical information provides a means by which the user can learn about an individual who may address the inquiry.

In step 370, the responses (biographies and answers or other information provided by the participants) are compiled and forwarded to the user. The user can make his selection of who he wishes to communicate with based on the biographies.

The following is an example of how an embodiment such as described in FIGS. 1-3 may be implemented. A person may need to relocate to Chicago. The person may be in need of a special heart medication. What the person may need to know is how much the medication will cost in Chicago, and how readily available the new medication is. Under an embodiment such as described in FIGS. 1-3, the user may access service 110, select "medical category" through UI 212, enter an inquiry "I need to check the availability of my heart medicine in Chicago, and its price . . . " and then send the message. The service 110 will receive the message, locate the geographic information (Chicago) and make a selection of who should receive the information. In one example, the service 110 may send the inquiry to the Chamber of Commerce in Chicago. In another example, the service 110 may send the inquiry to one or more identified doctors or cardiologists. An embodiment such as described above may also be implemented in a social network such as described with FIG. 5B.

Figure 4:
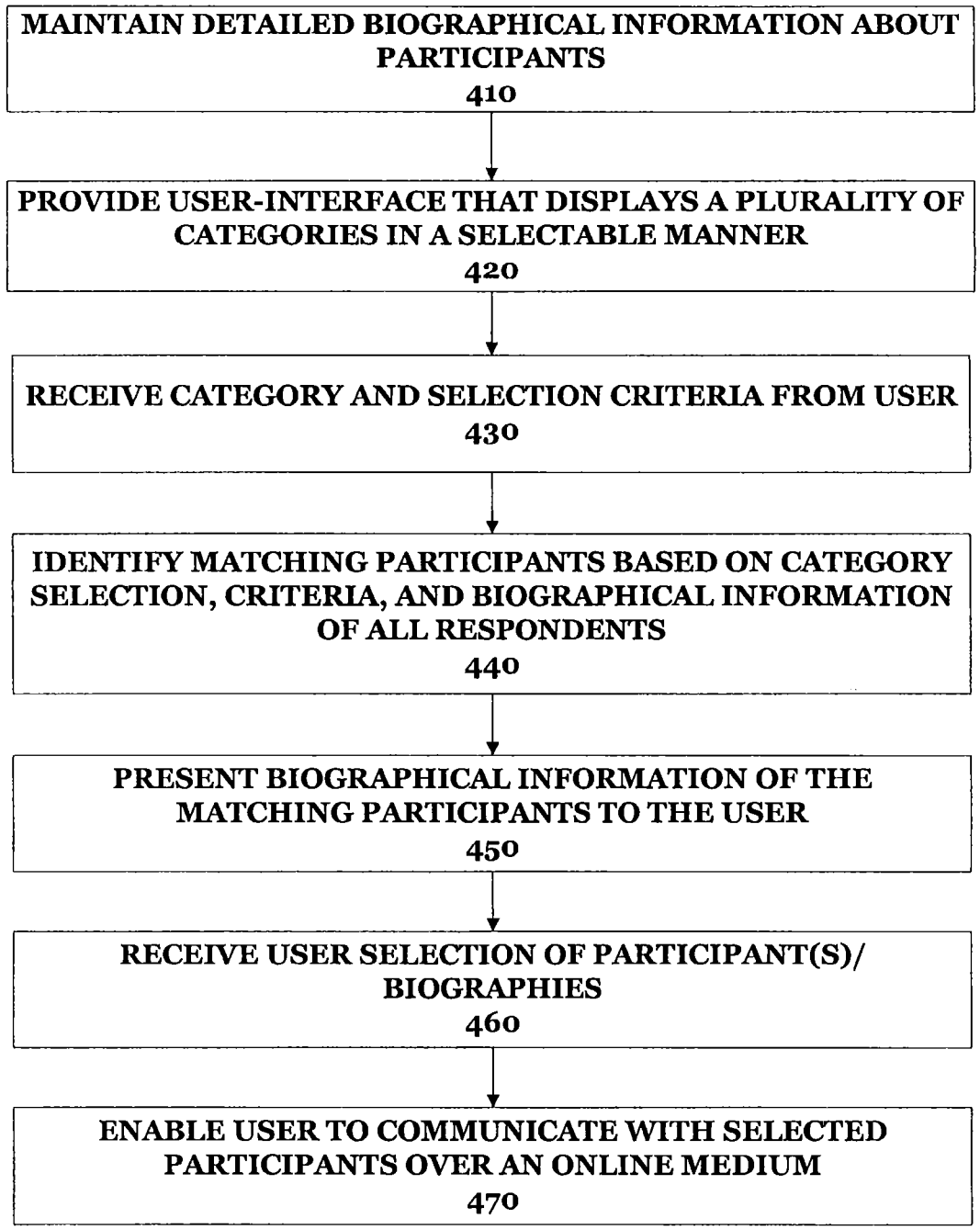
FIG. 4 illustrates a method that illustrates another implementation of a social network service, under an embodiment of the invention.

Method for Presenting Participant Choices to User Before Participant is Contacted FIG. 4 illustrates a method that illustrates another implementation of a social network service, similar to embodiments described in FIGS. 1 and 2. A method such as described with FIG. 4 may be implemented as a variation to the embodiments described in FIGS. 1-3. Reference to numerals of FIG. 1 or FIG. 2 is intended to illustrate suitable components for performing a step of the method.

In step 410, biographical information about participants (or individuals who belong to the participants) is maintained. This information may be detailed, so that a stranger reviewing the biographical information can learn about the individual who is the subject of the biographical information, without having to exchange communications with that person. The biographical information about the participants may be stored in the database 214. An individual may supply his own biographical information for the service 110. In one example, the service may mandate a form with fields and mandatory content that the individual or participant must provide information for. Examples of content that may be included in the biographical information includes: (i) a picture or photo album, including one of the person who is the subject of the biography, (ii) contact information for the person, (iii) information about the person's profession or expertise, (iv) personal information, including hobbies.

As with an embodiment such as described in FIG. 2, step 420 may provide for a user-interface that displays a plurality of categories in a selectable manner. For example, UI 212 may list categories and provide other fields for enabling the user to enter inputs that include selection criteria.

In step 430, category and selection criteria are received from the user. The selection criteria is information that the user enters to assist the selection of participants to handle the user's inquiry. The criteria may be a keyword, subject heading or other information. The criteria may also correspond to the category selection. Other examples of selection criteria include geographic selection. For example, in the context of people relocation, a user may wish to know about a specific category from people who reside in the location where the user is moving to.

In step 440, participants are identified based on the category and selection criteria, and whether or not the respective participants biographical information includes the category and/or selection criteria. In an embodiment such as described with FIG. 2, this step may be performed by module 210, as it accesses information contained in database 214 using input received from the user through UI 212.

In step 450, the participants that match the category and selection criteria are presented to the user. The presentation of the participants may again be done through the UI 212.

Step 460 provides that a user-selection of one or more participants is received from the user through a second set of inputs. Given a set of biographies presented in step 450, the user may, for example, select one participant (based on the biography). Then in step 470, the user is enabled to communicate with the selected participant(s) over an online medium. For example, once the user makes a selection of which participant the user wishes to communicate with, the user may submit an inquiry or request for the participant identified in step 450. The service 110 may handle the request by forwarding the request to the identified participants. In such an embodiment, an email address or other contact information may be shielded from the user. In one variation, it is also possible to shield the identity of the participant, or the end person who will be communicating with the user. Specific examples of communications over an online medium include the following: email exchange, instant messaging, web blog (e.g. exchange of web blog URLs), video/audio broadcasts (including over data networks). It is also contemplated that communications will be possible over mediums that are not online (e.g. offline, telephone, in-person).

According to another embodiment, the user may make multiple selections at different times. For example, the user may store the biographies, select one for a first communication exchange, and if the user is not satisfied, select another biography at a later time. The user may select to have his issue and/or response be held private by service 110, or published to groups of users as a public item.

Other examples of how subsequent communications between selected participants/individuals and the user may be performed include one or more of the following: chat room, video-conference call, telephone call (blind) etc.

Method for Resolving Issues

Figure 5A:
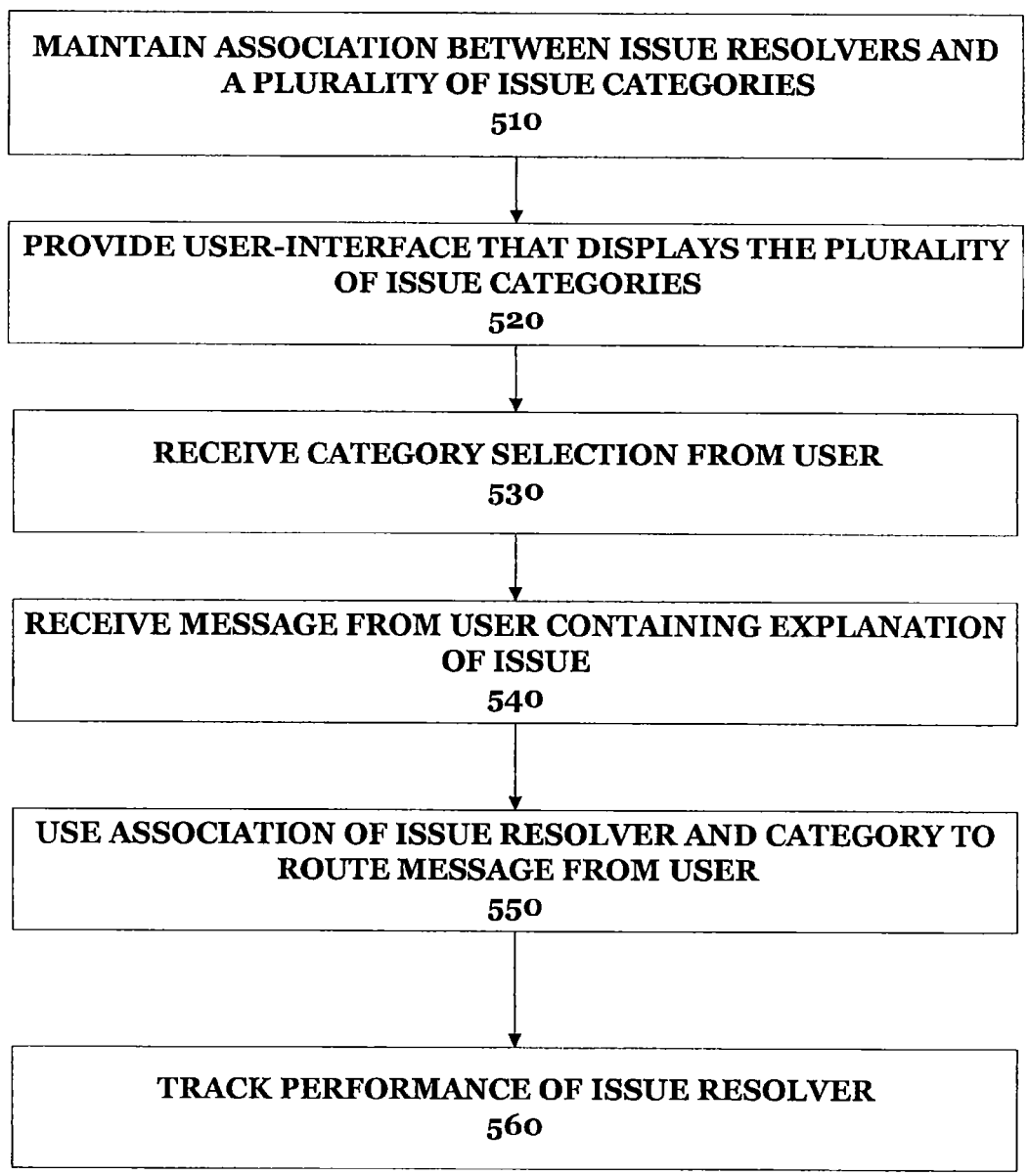
FIG. 5A illustrates yet another method in which issue resolvers are provided as part of a social network, and the performance of the issue resolvers is tracked.

FIG. 5 illustrates another method that illustrates another implementation of a social network service, similar to embodiments described in FIGS. 1 and 2. A method such as described with FIG. 5 may be implemented for purpose of resolving a user's issues, and as a variation to the embodiments described in FIGS. 1 and 2. Reference to numerals of FIG. 1 or FIG. 2 is intended to illustrate suitable components for performing a step of the method.

In step 510, an association between a plurality of issue resolvers and a plurality of issue categories is maintained. An issue resolver may correspond to a participant (an individual or other entity) who is known to be able to handle, and perhaps resolve issues of a specific nature. Individual issue resolvers may be associated with issue categories, so that one category selection in a subsequent step automatically identifies at least one participant who is known to be able to resolve the issue. The association between the issue resolvers and the categories may be stored in the form of data (e.g. metadata) in database 214.

Step 520 provides a user-interface that displays the plurality of categories. For example, UI 212 may be configured to display a designated set of categories, each of which have associated with it at least one participant who is the issue resolver for that category.

In step 530, the category selection is received from the user. At or about the same time, an embodiment provides that in step 540, a message is received from the user containing an explanation of an issue that falls under the category. In one embodiment, the user may select a link provided on UI 212, which signals the category selection to the module 210. The selection of the link also causes a message body to be opened. The user may then type an issue or question about the selected category. As another embodiment, selection of the link may cause a category identification to be inserted into the message. For example, the category identification may be provided in the subject line of an email message.

In step 550, the user's message is routed to a participant/respondent who is designated to resolve issues for the category selected by the user. For example, service 110 may use database 214 to determine the association between the category of the issue and the issue resolver assigned to that category. Thus, the user may submit an email, for example, to a category heading, but the recipient of the email is not known to the user.

In step 560, the performance of the particular issue resolver is tracked. This may entail one or more of the following: (i) timing how long it takes for the identified issue resolver to get back to the user, (ii) if subsequent communications are exchanged between user and issue resolver, timing the responsiveness of the issue resolver to each user communication, (iii) receiving feedback from the user on how well the issue resolver resolved the user's issue, (iv) other objective or subjective criteria for determining the effectiveness of the issue resolver for the user. Implementing a tracking step may include time stamping every communication from an issue resolver, and possibly every communication from the user to the issue resolver. In one embodiment, a social network service receives reports from users, and/or generates reports on behalf of the user. The reports may be stored, and made available to other users of the service 110 as a mechanism to enable those users to evaluate the service, how the service resolves issues of a particular category, and/or how individual participants/resolvers have performed in the past.

A particular issue contemplated by embodiments of the invention includes corporate relocation assistance. A typical setting may be the military, or a corporation where new hires, transferees, business travelers, college interns, and employees (or prospective employees) are asked/required to relocate/travel from time-to-time. Under a current approach, such corporations typically have a human resource department, or other internal relocation departments who facilitate the entire arduous process of relocation. But numerous parties, both inside and outside of the company become involved in the relocation efforts, usually months before the move begins. When the person relocating has an issue, an embodiment such as described with FIG. 5 enables the person to locate the right individual to have his or her issue resolved using a simple interface. For example, the user may select a category of "packing and moving" and write a question regarding an item that was broken by movers. The exact time the inquiry was sent out may be recorded, and how the issue is resolved may be monitored as a way for the corporation to evaluate the moving company. Thus, if an issue is ignored, not timely answered, or poorly resolved, the company which hires the moving company will have knowledge of it for future use. The service 110 has associated a customer service representative of the moving company to field the inquiries to "packing and moving". The response is forwarded by the service 110. The reply, and possibly how well the issue was resolved on behalf of the relocator, is then tracked through feedback and responsiveness.

The example described above may be extended to family members of the person relocating. Consider an example of an employee of an international company who receives a new job assignment requiring the employee to relocate from Germany to the United States. Studies have shown that for the relocation to be successful, the spouse and immediate family of the person being relocated must assimilate or integrate into a new community. This means a sense of belonging to a new community, as well as developing relationships in the community that are essential for the family and the employees. If this does not occur, most relocations do not survive within the new location. An embodiment such as described above enables the assimilation process to begin before the family is ever located by enabling the spouse and other family members to research and resolve their issues with other persons/entities who can be of assistance to them. Requesting assistance from individuals that one does not know is a way to develop a relationship of trust within a new area because people are helping transferees and family members to settle into their new area. In one example, the spouse may have her own business (e.g. a flower shop) and she may be interested in learning whether she can continue her business in their new town. She does not know the laws regarding small businesses, and she has no contacts in the part of town they will live in. There may be children in the family, and for example, one child may have a handicap, such as hearing loss. This child may need a school with a special teaching program. Housing issues may exist as well. The new family may not know where to buy a home or what town they will live in. The initial plan may be to rent a home near the place of work until the family as a whole becomes more familiar with the area. There may be added stress in that neither the spouse nor anyone else in the family speaks English well.

Without any assistance, the spouse or other family member may spend a great deal of time conducting research through generic sources, such as the Internet, in an effort to find information about the resources for resolving the families issues in the move. Under a traditional approach, the result would be that the family would receive a list of schools, and names of strangers or phone numbers. Other issues the family would have would be handled in the same way-the spouse, for example, would find initial starting points to having the issues answered, but there would be no assistance, or guidance, other than other general non-personal assistance. In an international move, the spouse and family will face the additional challenges of cultural differences and language barriers.

According to an embodiment, the spouse may be provided access to a software suit, based on embodiments described with FIGS. 1-5. From the interface, she may specify a category for individual issues that the spouse or other family may have regarding the life issues they all face in making the move. For example, from a list of categories provided in a menu, she might make one or more selections that lead her to the category of "schools" or and/or "local business laws". In either case, after selecting the issue, she identifies the new location (e.g. town, city, nearest metropolis, county etc) of the family's relocation. She may use a text-entry or menu selection to identify the new location, and then use a message body to ask her question or present her issue. For example, she may request assistance on business rules for small business owners under the heading of "local business laws" or she may ask which schools offer assistance in the area for her child's particular handicap. For the topic heading of "local business laws", service 110 may forward her issue to a Chamber of Commerce in the new city, or even to a specific individual in that organization who can provide assistance. Her inquiry regarding the category of "Schools" may go to an agency that handles such questions for relocators on behalf of the corporation seeking to relocate their employee. In the latter case, the performance of the agency may be tracked.

The response that the spouse may receive may be in the form of a one-to-one personal response. The service 110 may be pre-configured so that the respondents/participants in a particular location are individuals who can provide a personalized response and be available for subsequent communications. If the response requires information from others who can help, it is possible for the user's inquiry to be forwarded to others within that organization or outside of that organization who will also send their bios. The result is that the spouse, who may be located in Germany, is networked to individuals who can establish answers to her issues, assist her relocation on a personal and/or professional level, and perhaps include the spouse/family in a growing social network of trusted contacts for the particular location.

As an alternative to an embodiment such as described with FIG. 4, the service may provide information about potential issue resolvers that the user may select from. Biographies of individuals may be stored and associated with specific categories and issues. For example, individuals may enter their biography or personal information for use with service 110. When the user presents the issue to the service 110, the service provides matching biographies without going outside of the service. Thus, in the example provided above, the service 110 may provide a list of individuals whom the service 110 has identified internally as being candidates for responding to questions about local business laws. The biographies provide the spouse the ability to see who has the most potential for responding to her question about running a local floral shop. For example, she may see another florist in the biography, and she may use service 110 to establish communications with that person.

Social Networking Resolution of Issues

However, for whatever reason, a first issue resolver may be a referral source of the issue. For example, in one situation, the individual ("Connection 1") that the user has selected may not be able to solve the problem or answer the question the user has submitted. In other instances, Connection 1 may see other questions or issues the user has on their bio which are not related to the question posed. In either case, Connection 1 may know of others, either inside or outside of his or her network of contacts (on-line, personal, friends, family etc.), who may be able to assist the user with either the original issue or other issues that become apparent.

Figure 5B:
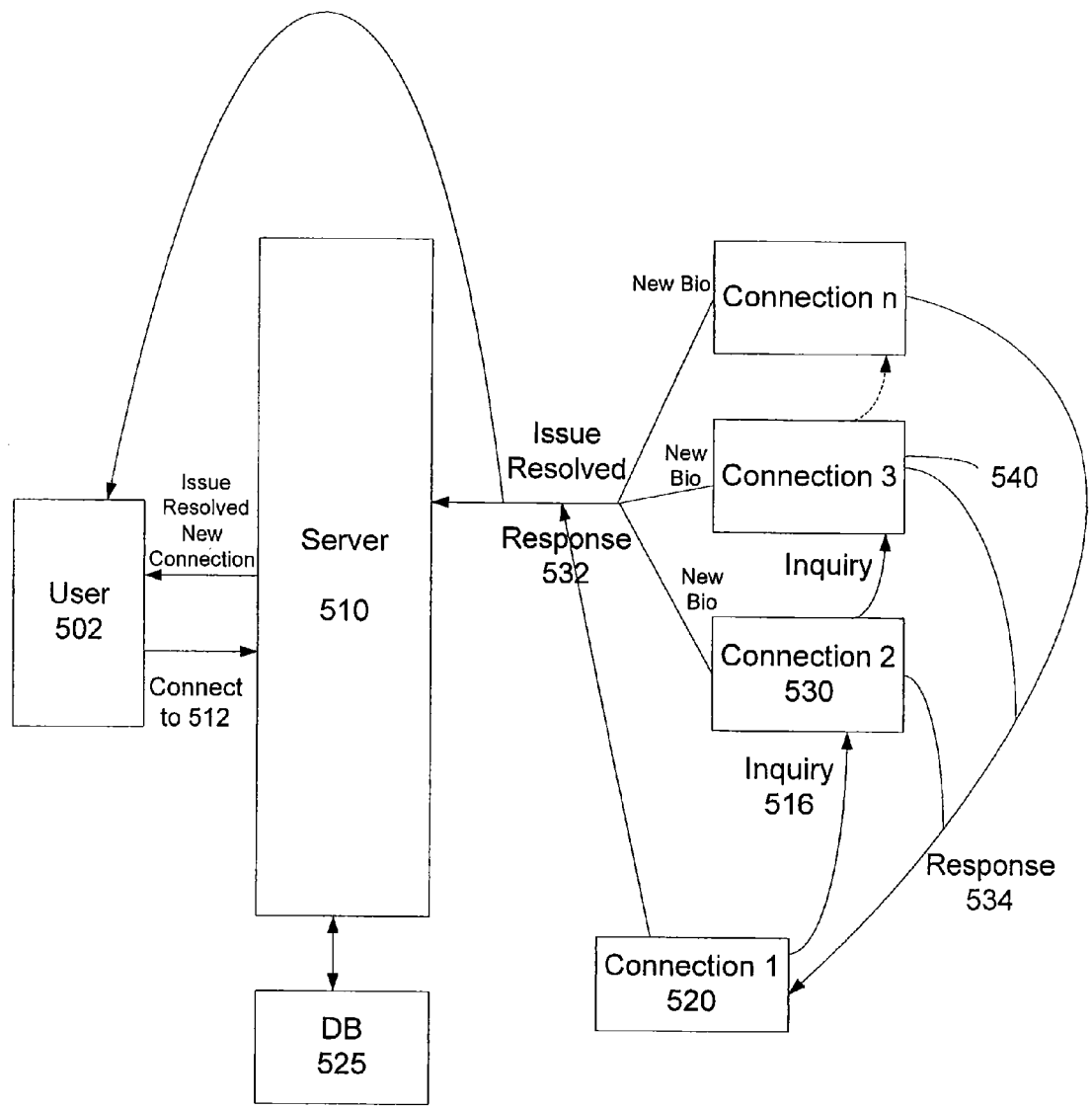
FIG. 5B illustrates a method in which a user is able to select an issue resolver from the social network and the issue resolver is able to invite other issue resolvers into the users social network.

In regard to any of the embodiments described herein, a social networking system, whether formally and programmatically established through a service, or information through personal contacts, may be used to resolve issues and connect one individual with another for purpose of solving life issues. As such, while an initial point of contact may yield one person, a social networking framework may mean that the responder may actually be someone who knows the initial point of contact (one degree), or someone who knows the person of one degree (second degree) and so forth. FIG. 5B illustrates a system for establishing and using a social network in such cases. In FIG. 5B, a social network is established by a server-side system 510, to which a user 520 (through client terminal) connects with.

In one implementation, the user 502 submits an inquiry 512 of an issue resolution nature to the service 510. A direct connection may be established when the inquiry communication 512 is forwarded to the resolver. This connection is termed Connection 1 520, and it represents the issue resolver (which can be a person, agency, or other entity) and his communication with the service 510. One typical occurrence is that Connection 1 520 handles a response 514 to the issue resolution. The response 514 may be handled in a manner described by other embodiments herein. The response 514 is shown to be to service 510, although it can be direct to the user 502.

There are other cases where Connection 1 520 is not the resolver, or where Connection 1 520 is a resolver-in-part. In cases such as this, Connection 1 may seek to add another individual with whom Connection 1 520 is familiar with and believes is an expert in the particular field in question. A second individual, Connection 2 530, is invited to join the network by Connection 1 520 by an invite 516, such as in the form of an email or some other mode of communication (e.g. announcement, phone call, posted message, instant message etc). After receiving the invitation 516, one embodiment provides that Connection 2 530 logs onto the system and creates a profile 532, or at least provides some sort of information about himself. The profile 532 is then associated with the particular issue in question and is stored by a database 525. The profile 532 is then returned by the service 110 to the user for the user's consideration. The user 502 then has the option of choosing whether to allow Connection 2 530 to resolve the issue (separately or in addition to assistance from Connection 1 520).

In another embodiment, Connection 2 530 is able to see the issue immediately upon accepting the invitation and creating a profile. Upon joining the network, Connection 2 530 may issue a response 534 to either the user directly, through the system 110, to Connection 1 520 through the system 110, or directly to Connection 1 who will then respond to the user either directly or through the system 110.

Still further, in some cases, the user may not want Connection 2 530 to know the particular issue the user has without first reading Connection 2's profile. An embodiment provides that the service 510 hosts the interaction between the user 502 and the Connection 530 in a manner where (i) user 502 sees the profile 532 of Connection 2 530, but Connection 2 knows nothing about the user; (ii) user 502 learns the identity of Connection 2 in addition to or as an alternative to learning the profile 532, but the Connection 2 does not learn any information about the user 502; (iii) either (i) or (ii), with Connection 2 seeing an anonymous profile of the user 502, and user 502 seeing the profile 532 of Connection 2. One or more of these implementations enable "blind" connections to be formed, where the user 502 can know more about the indirect connection to the contact of the first issue resolver (Connection 1

520). Furthermore, in such cases, when Connection 1 520 invites Connection 2 530 to join the system, the issue is not immediately associated with Connection 2 530 until the user has reviewed the profile and allowed Connection 2 to see the pending issue. After the user 502 has reviewed the profile the user may allow Connection 2 530 to resolve the issue and see other issues the user has pending. Connection 2 530 is contacted by the user through the system with the issue to be resolved, and the database 525, associates Connection 2 530 with the issue. Just as Connection 1 520 was able to do, Connection 2 530, may in turn invite others with whom Connection 2 is familiar with to join the network to help resolve the user's life issue. The cycle may repeat itself again. In either case Connection 1 520, originally selected by the user is an integral part in resolving the user's issues.

For example, in addition to the question of running a local floral shop above, the user has several other issues which need to be resolved before relocating to a new area. There may be questions on the user's bio, about where the children will be attending school if they move into a particular area, and what area has houses for sale. When Connection 1 520 is contacted regarding the question of running a floral shop, Connection 1 notices the other pending questions. Connection 1 520 happens to know the Superintendent of schools in the area and invites the Superintendent to join the network. The Superintendent logs onto the system, via the invitation from Connection 1 520 and creates a profile which is stored in the database. Depending on user preference, the question about schools is either immediately forwarded to the Superintendent for response, or the issue will only be forwarded after the user has viewed the newly created profile. If the user allows the issue to be resolved by the Superintendent, the database stores the new profile and associates the issue with the profile. The Superintendent of schools contacts either the user or Connection 1 though the system or directly to relay the needed information.

When the Superintendent, now Connection 2 530, has resolved the users issue, Connection 2 may notice the other issue the user has pending, the question about houses for sale in the area. Connection 2 may know a trusted real estate broker who can help the user. Connection 2 then invites the real estate broker, Connection 3 540, to join the network and the cycle repeats itself, in a manner provided by one or more embodiments or implementations described above. As such, one embodiment provides that the user can be in total control of who the user wants resolving the issues in question.

With embodiments described above, additional role of service 510 is to execute processes where communications (e.g. inquiries 512 and responses 514) are passed between user 502 and Connection 1 520. The service may also maintain the profiles 532, execute protocols to maintain the connections in blind form, and perform other functions such as enable programmatic invitations, and on-line communication mediums for enabling back and forth communications such as described.

As mentioned, a social network such as shown by FIG. 5B may be implemented through use of a centralized network enabled computer or system of computers, such as a server. Other embodiments may provide a network such as described to be distributed to multiple machines. Still further, one or more embodiments may implement a social network such as described on a peer-to-peer network. In all these situations, the social network enables contact and communication amongst people who may not know each other, but know others (who may know others etc) to indirectly establish the relationship.

User-Interfaces

FIGS. 6A-6E illustrate suitable interfaces that may be employed with one or more embodiments of the invention. Interfaces such as shown in FIGS. 6A-6E may be generated by service 110, either over a network or through a client application. For example, the UI 212 may generate individual interfaces for purpose of receiving input.

Figure 6A:
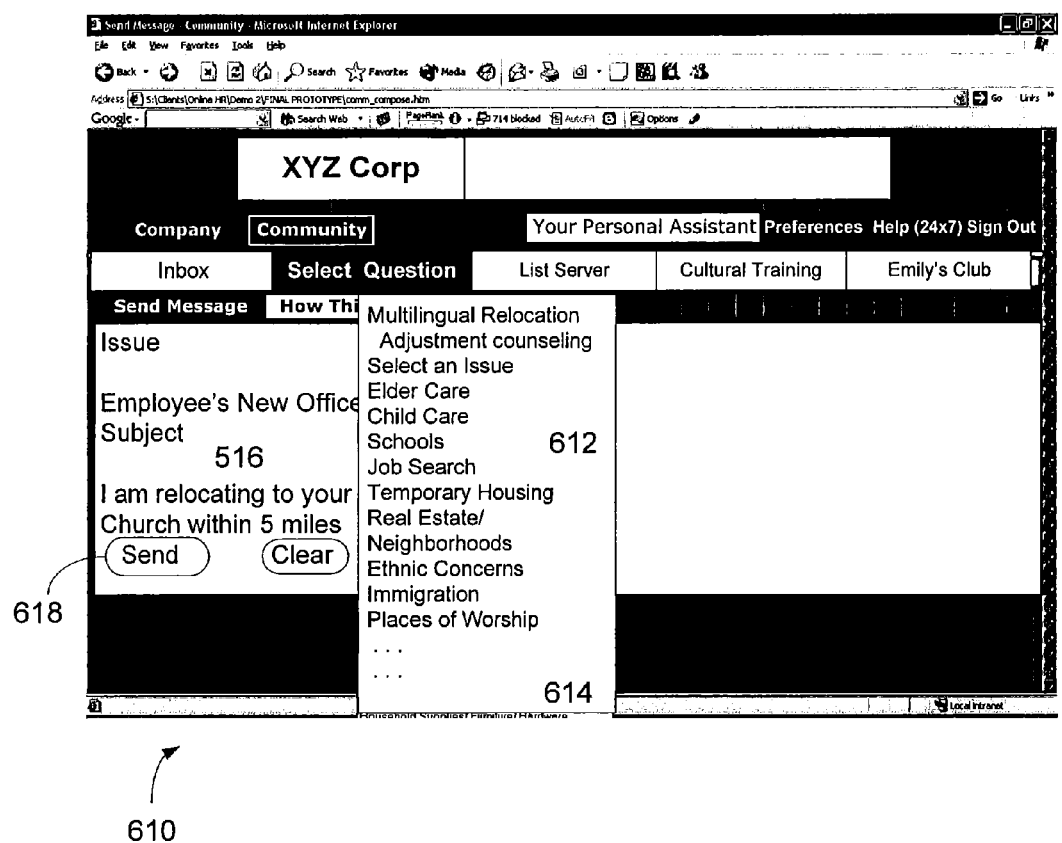

In FIG. 6A, an interface 610 is presented for a user to (i) select a category and (ii) input an inquiry. The interface 610 may provide a list 612 of categories, each selectable through a menu or iconic feature. The categories presented in the list 612 are examples of general categories needed for an individual to relocate or move into a new location. A selected category 614 is illustrated as being "Multi-Cultural/Church." A text field 616 provides a feature in which a user may enter his or her inquiry related to the selected category 614. Once the user has completed his or her inquiry, she may send the inquiry out through selection of the send icon 618. One or more genre fields 620 may be provided that provide more category lists, each including additional categories that are identified are sorted on some other general topic heading. For example, a cultural genre may list categories that pertain to cultural issues for individuals relocating to a new place. Categories in different genre's may overlap or be personalized. For example, select categories from different genre's that are particularly pertinent to a user may be listed in one genre "Emily's Club".

FIG. 6B illustrates an electronic form 625 for a user to submit a category-specific inquiry, according to an embodiment. In an example provided by FIG. 6B, the context of the form is relocation. The form may be filled out by anyone seeking to relocate to a new city, for example. The form 625 may include a location field 630 for a user to enter his or her location, a topic field (e.g. "Schools") for the user to enter the topic or category of his inquiry, a work location field 634 and a zone field 636 for the user to enter additional geographic information, a message subject heading 638 and a text body 640 where the user can enter his inquiry or issue ("Hello I need a referral to a school that can assist my 10 year old deaf child.").

FIG. 6C illustrates another interface 645 that is company specific (e.g. used internally by one company or organization) to resolve relocation issues by category. A list 650 of categories may be provided, along with a text area 652 where a person may enter an issue or raise a question under a selected category. In an example provided, a recipient may be pre-designated for each category. Thus, the user's message will be routed to whoever is designated to receive issues falling under that category.

Figures 6D, 6E:
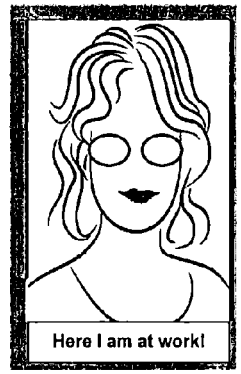

FIG. 6D illustrates an example of a biography 660 that can be returned as part of a response. In one embodiment (such as described with FIG. 3), the biography 660 is returned by the respondent, possibly along with a response to an issue that the user had inquired about. In another embodiment such as described in FIG. 4, the biography 660 is stored in database 214 and returned by the service 110 when an inquiry includes selection criteria contained in the biography.

FIG. 6E illustrates additional biographies 670 and 680 for use in personal activities. The example provided includes biography 670 for a hobbyist (paintball) and a biography 680 for a teenager. In the latter case, the teenager biography 680 may be stored with other similar biographies. In a family relocation, a new teenager into an area may enter his or her biography into the database 214, and allow others to browse her biography. In turn, she may browse the biographies of other people in her new location, and use the biographies to establish new friends. For a teenager relocation service, biographies of students may be recruited from numerous schools across the country, in an effort to enable relocating new students assimilate into their new surroundings. In the examples provided, the biographies 670 are searchable, and include email addresses (or IM tags or other contact information) to enable the individuals behind the biographies to meet one another.

Roommate Pairing

Figure 7:
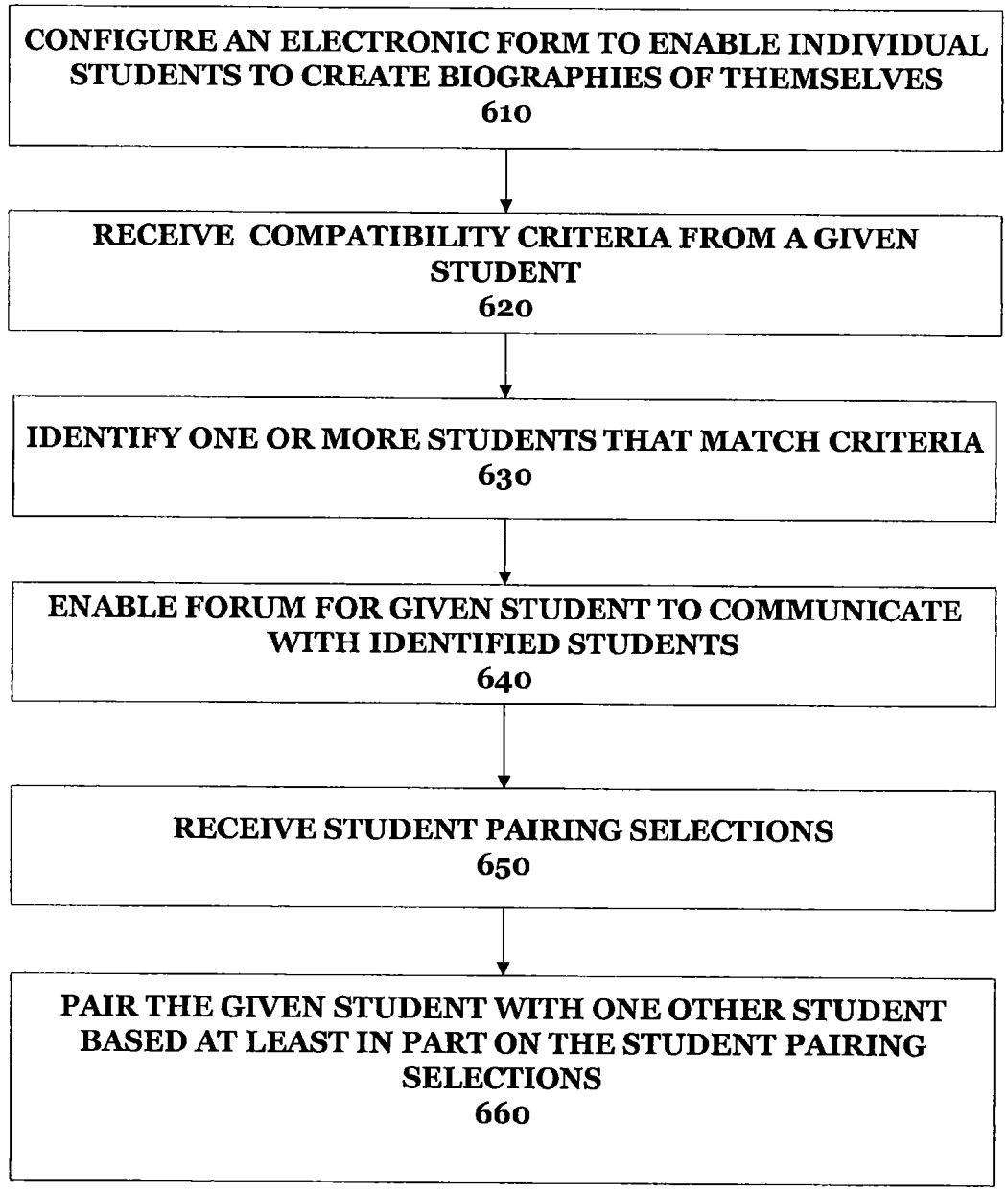
FIG. 7 illustrates a method for pairing roommates using a social network service, under an embodiment of the invention.

In the context of roommate pairing, a social network application may be implemented to facilitate good pairings. Roommate pairing may be done by the potential roommates themselves, such as in the corporate intern setting where new interns to a given location look on their own for similarly situated individuals as roommates for a brief period of time. Roommate pairing may also be done through the control of an outside body, such as a student housing committee on a college campus. A method such as described in FIG. 7 may be applicable to the latter case, where potential roommates may be able to use a social network system to meet one another, learn about their respective compatibility, and then influence the roommate pairing decisions by the outside body. Since determining student roommate pairings is a primary application of an embodiment, a method such as described in FIG. 7 is described in the context of roommate pairings for students.

In step 710, an electronic form may be configured to enable individual students to create biographies of themselves. The form may be configurable by either one of the students, the educational establishment, and the body that makes the final decisions. Examples of what can be configured on the form include the information that an establishment or committee requires from the student. Specific examples include a picture, a major, where the student is from, what the student wishes to accomplish, a chosen career, a race or religion, hobbies and musical preferences. In addition to required fields, there may also be optional fields (e.g. favorite television show).

Step 720 provides that a compatibility criteria is received from a given student. This may include one or more criteria that the given student feels is necessary for a match to be successful. Examples include musical preference and religion.

In step 730, one or more students who match the criteria of the given student are then identified. For example, the compatibility criteria of the given student may be compared against specific fields in student biographies in order to determine matches for the given student. To provide a specific example, the given student may specify religion and musical preference, and other student biographies are searched for matches to those two criteria.

In step 740, a forum for a given student to communicate with identified students is enabled. This forum or medium may be, for example, any one or more of the following: (i) exchange of email addresses for email communications, (ii) exchange of IM tags to enable the students to participate in online chat sessions with each other, and (iii) network addresses corresponding to individual's web sites or blogs.

Step 750 provides that student pairing selections are received from the students, including from the given student. Thus, for example, various student pairing selections may be received from an entire class of students.

In step 760, the given student is paired with one other student based at least in part on the student pairing selections in step 750. The case may be that the given student selects a roommate, and that same roommate selects the given student. Or the given student may select someone who in turn selects someone else, or the given student has multiple choices, ranked in a particular order. In either case, the student pairing selections influence the end outcome of the roommate pairing decisions.

It should be noted that once students are placed in contact with one another through a matching of compatibility criteria, a service such as described in FIGS. 1 and 2 may extend a social network for the students to the friends and families of those students. For example, students may insert their biographies in database 214, their parent information, friends etc. Other students can search the biographies. Students who are compatible may be able to present biographical information about their new roommate and their roommates parents to their own parents. Thus, numerous variations, implementations and embodiments may be developed by combining a method such as described in FIG. 7 with embodiments such as described in FIGS. 1-6.

A system or scheme such as shown by FIG. 5B may be applicable in as an embodiment in which roommate pairing is performed for students. For example, according to one embodiment, a student, roommate or other user may have a question regarding books needed for certain classes, or what professors students prefer for certain subjects. The user can search the database for an issue resolver and make a Connection 1 520. Connection 1 520 through the server 510 can then respond 532 to the students questions regarding the books or the professor for a particular subject. Connection 1 520 can also invite 516 other connections to join the users social network and who then can respond 532 to the user 502 either directly, through the original connection 1 520, or through the server 510.

Furthermore, an embodiment may be implemented similar to FIG. 7, except it enables students (or interns or other individuals who need contacts in a new community) to pair with one another for social purposes. For example, individual students may complete biographies and provide the biographies to the service 110, where it is maintained in, for example, database 214. Students may submit compatibility criteria, in which case the profiles of other students are presented to them. From the profiles presented, the student may review the biographical information and make further selections. The service 110 may then enable the student to locate and communicate with selected individuals who correspond to the profiles.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for establishing a social network, the method comprising:

maintaining a list comprising a plurality of participants, wherein each participant in the plurality of participants corresponds to one or more individuals, wherein the list also includes information associated with at least one of each participant or the one or more individuals that correspond to each participant;

presenting a user with a plurality of categories from which the user may make a selection of a category from the plurality of categories;

receiving the selection of the category by the user;

in conjunction with the selection of the category, receiving an electronic communication from the user for an unidentified respondent, wherein the electronic communication contains an inquiry of the user;

after receiving the selection of the category by the user, selecting one or more participants from the list to receive the electronic communication, wherein selecting is based at least in part on the selection of the category or the information associated with at least one of each participant or the one or more individuals that correspond to each participant;

sending the inquiry to the selected one or more participants;

receiving a response to the inquiry from the selected one or more participants, the response from each of the one or more participants including biographical information about that participant;

publishing at least a portion of the response from each of the selected one or more participants for other users to view, wherein publishing is performed without identifying the user but includes providing biographical information about the participant who provided the response;

tracking feedback for each of the selected one or more participants based at least in part on the published portion of the response, including determining a rating from the user for at least one of the selected one or more participants.

2. The method of claim 1, wherein the category of the selection corresponds to an expertise.

3. The method of claim 1, wherein the category of the selection corresponds to a geographic location.

4. The method of claim 1, further comprising linking the user or the one or more participants to a social network account or activity.

5. A non-transitory computer-readable medium that stores instructions which can be executed by one or more processors to perform operations comprising:

maintaining a list comprising a plurality of participants, wherein each participant in the plurality of participants corresponds to one or more individuals, wherein the list also includes information associated with at least one of each participant or the one or more individuals that correspond to each participant;

presenting a user with a plurality of categories from which the user may make a selection of a category from the plurality of categories;

receiving the selection of the category by the user;

in conjunction with the selection of the category, receiving an electronic communication from the user for an unidentified respondent, wherein the electronic communication contains an inquiry of the user;

after receiving the selection of the category by the user, selecting one or more participants from the list to receive the electronic communication, wherein selecting is based at least in part on the selection of the category or the information associated with at least one of each participant or the one or more individuals that correspond to each participant;

sending the inquiry to the selected one or more participants;

receiving a response to the inquiry from the selected one or more participants, the response from each of the one or more participants including biographical information about that participant;

publishing at least a portion of the response from each of the selected one or more participants for other users to view, wherein publishing is performed without identifying the user but includes providing biographical information about the participant who provided the response;

tracking feedback for each of the selected one or more participants based at least in part on the published portion of the response, including determining a rating from the user for at least one of the selected one or more participants.

6. The non-transitory computer readable medium of claim 5, wherein the category of the selection corresponds to an expertise.

7. The non-transitory computer readable medium of claim 5, wherein the category of the selection corresponds to a geographic location.

8. The non-transitory computer readable medium of claim 5, further comprising instructions which when executed by the one or more processors, cause the one or more processors to perform an operation of: linking the user or the one or more participants to a social network account or activity.

* * * * *